United States Patent
Smith et al.

(10) Patent No.: US 6,195,530 B1
(45) Date of Patent: Feb. 27, 2001

(54) SELECTIVE MESSAGING VIA ON-SCREEN DISPLAY

(75) Inventors: Elizabeth A. Smith, Cumming; Lee R. Johnson, Lawrenceville, both of GA (US); Howard L. Myers, Columbia, MO (US)

(73) Assignee: Scientific-Atlanta, Inc., Norcross, GA (US)

( * ) Notice: Subject to any disclaimer, the term of this patent is extended or adjusted under 35 U.S.C. 154(b) by 0 days.

(21) Appl. No.: 08/338,164

(22) Filed: Nov. 8, 1994

Related U.S. Application Data

(63) Continuation of application No. 08/265,941, filed on Jun. 27, 1994, now Pat. No. 5,754,940, which is a continuation of application No. 07/960,261, filed on Oct. 13, 1992, now Pat. No. 5,355,480, which is a continuation of application No. 07/342,987, filed on Apr. 20, 1989, now abandoned, which is a continuation-in-part of application No. 07/289,218, filed on Dec. 23, 1988, now Pat. No. 4,987,486.

(51) Int. Cl.⁷ .............................. H04N 7/00; H04M 1/00
(52) U.S. Cl. ..................... 455/5.1; 455/6.3; 455/566; 348/6; 348/8; 348/10
(58) Field of Search ....................... 455/5.1, 6.1, 6.2, 455/6.3, 566; 348/6, 9, 10, 12, 13, 468, 563, 564, 8, 465

(56) References Cited

U.S. PATENT DOCUMENTS

| | | |
|---|---|---|
| 3,221,098 | 11/1965 | Feldman et al. . |
| 3,539,999 | 11/1970 | Houldin et al. . |
| 3,757,037 | 9/1973 | Bialek . |

(List continued on next page.)

FOREIGN PATENT DOCUMENTS

| | | |
|---|---|---|
| 3021647A1 | 6/1980 | (DE) . |
| 0 103 438 | 3/1984 | (EP) . |

(List continued on next page.)

OTHER PUBLICATIONS

Jun. 25, 1987 letter from Raymond Ayoub of General Instruments to Tulsa Cable.

(List continued on next page.)

*Primary Examiner*—Reinhard J. Eisenzopf
*Assistant Examiner*—Lester G. Kincaid
(74) *Attorney, Agent, or Firm*—John Eric West; Kenneth M. Massaroni; Hubert J. Barnhardt, III

(57) ABSTRACT

An interactive terminal comprises a processor, a local data store connected to the processor, a character generator responsive to processor control for generating a television signal output to an associated television receiver, a key pad or remote control for inputting information to the processor, and a power supply input. The terminal is coupled, via 2-way RF communications, to a central location, designated as the system manager, where the terminal is accessed by polling for monitoring and servicing terminal user requests. The interactive terminal has a local storage capacity for storing a number of character screen commands, accessed from a central data base at the system manager, for use in generating prompting screens displayed on the television receiver. In use, a user may call for a variety of services by operating the input keys of the key pad to cause a prompting screen to be displayed. Screen commands are stored at the terminal according to an assigned priority. The stored screen commands also include pointers which are used by the terminal processor to prefetch screens which will likely follow the current screen in a decision tree structure manner. Thus, screens may be prefetched from the central data base and downloaded for storage at the terminal so that they are available for display if and when called for. If a particular branch of a decision tree is not selected, screens associated with the unselected branch are deleted from terminal memory as needed to make room for new screens. The terminal memory is also controlled so that data is swapped in and out of memory based on its relative priority.

16 Claims, 7 Drawing Sheets

U.S. PATENT DOCUMENTS

| | | |
|---|---|---|
| 3,819,862 | 6/1974 | Hedges . |
| 3,833,757 | 9/1974 | Kirk, Jr. et al. . |
| 3,894,176 | 7/1975 | Mellon . |
| 3,894,177 | 7/1975 | Howell et al. . |
| 3,906,457 | 9/1975 | Mattedi et al. . |
| 3,968,327 | 7/1976 | Gregg, III . |
| 4,012,583 | 3/1977 | Kramer . |
| 4,031,543 | 6/1977 | Holz . |
| 4,059,850 | 11/1977 | Van Eck et al. . |
| 4,072,825 | 2/1978 | McLay et al. . |
| 4,186,438 | 1/1980 | Benson et al. . |
| 4,218,698 | 8/1980 | Bart et al. . |
| 4,264,924 | 4/1981 | Freeman . |
| 4,319,277 | 3/1982 | Nicholson et al. . |
| 4,388,645 | 6/1983 | Cox et al. . |
| 4,403,303 | 9/1983 | Howes et al. . |
| 4,414,621 | 11/1983 | Bown et al. . |
| 4,425,579 | 1/1984 | Merrell . |
| 4,439,784 | 3/1984 | Furukawa et al. . |
| 4,451,701 | 5/1984 | Bendig . |
| 4,451,895 | 5/1984 | Sliwkowski . |
| 4,455,570 | 6/1984 | Saeki et al. . |
| 4,476,488 | 10/1984 | Merrell . |
| 4,486,779 | 12/1984 | Marti . |
| 4,494,111 | 1/1985 | Rocci et al. . |
| 4,510,568 | 4/1985 | Kishi et al. . |
| 4,527,204 | 7/1985 | Kozakai et al. . |
| 4,531,020 | 7/1985 | Wechselberger et al. . |
| 4,536,791 | 8/1985 | Campbell et al. . |
| 4,538,174 | 8/1985 | Gargini et al. . |
| 4,546,382 | 10/1985 | McKenna et al. . |
| 4,575,579 | 3/1986 | Simon et al. . |
| 4,575,750 | 3/1986 | Callahan . |
| 4,586,035 | 4/1986 | Baker et al. . |
| 4,586,158 | 4/1986 | Brandle . |
| 4,600,921 | 7/1986 | Thomas . |
| 4,613,946 | 9/1986 | Shar et al. . |
| 4,633,297 | 12/1986 | Skerlos et al. . |
| 4,677,488 | 6/1987 | Zato . |
| 4,688,167 | 8/1987 | Agarwal . |
| 4,694,490 | 9/1987 | Harvey et al. . |
| 4,698,670 | 10/1987 | Matty . |
| 4,700,378 | 10/1987 | Brown . |
| 4,700,386 | 10/1987 | Kohn . |
| 4,701,794 | 10/1987 | Fröling . |
| 4,710,955 | 12/1987 | Kauffman . |
| 4,712,239 | 12/1987 | Freeza et al. . |
| 4,716,410 | 12/1987 | Nozaki . |
| 4,718,107 | 1/1988 | Hayes . |
| 4,734,764 | 3/1988 | Pocock et al. . |
| 4,739,510 | 4/1988 | Jeffers et al. . |
| 4,751,578 | 6/1988 | Reiter et al. . |
| 4,758,946 | 7/1988 | Shar et al. . |
| 4,768,228 | 8/1988 | Clupper et al. . |
| 4,782,463 | 11/1988 | Sanders et al. . |
| 4,786,967 | 11/1988 | Smith et al. . |
| 4,789,863 | 12/1988 | Bush . |
| 4,791,561 | 12/1988 | Huber . |
| 4,792,972 | 12/1988 | Cook, Jr. . |
| 4,814,972 | 3/1989 | Winter et al. . |
| 4,829,569 | 5/1989 | Seth-Smith et al. . |
| 4,885,775 | 12/1989 | Lucas . |
| 4,890,319 | 12/1989 | Seth-Smith et al. . |
| 4,890,321 | 12/1989 | Seth-Smith et al. . |
| 4,894,789 | 1/1990 | Yee . |
| 4,959,719 | 9/1990 | Strubbe et al. . |
| 4,963,994 | 10/1990 | Levine . |
| 4,977,455 | 12/1990 | Young ................................... 358/86 |
| 4,991,011 | 2/1991 | Johnson et al. ..................... 358/141 |
| 5,001,554 | 3/1991 | Johnson et al. ....................... 358/86 |
| 5,003,591 | 3/1991 | Kauffman et al. .................... 358/86 |
| 5,016,273 | 5/1991 | Hoff ..................................... 340/825 |
| 5,053,883 | 10/1991 | Johnson .............................. 358/349 |
| 5,091,937 | 2/1992 | Kawasaki .............................. 380/20 |
| 5,142,576 | 8/1992 | Nadan .................................... 380/20 |
| 5,155,591 | 10/1992 | Wachob ................................. 358/86 |
| 5,260,778 | 11/1993 | Kauffman et al. .................... 358/86 |
| 5,296,932 | 3/1994 | Long .................................... 348/731 |

FOREIGN PATENT DOCUMENTS

| | | |
|---|---|---|
| 0 178 866 | 11/1985 | (EP) ............................ H04N/5/445 |
| 0 190 837 | 1/1986 | (EP) . |
| 1 536 534 | 12/1978 | (GB) . |
| 2 062 422 | 5/1981 | (GB) . |
| 2 063 027 | 5/1981 | (GB) . |
| 2 165083 | 9/1985 | (GB) . |
| WO 90/02467 | 3/1990 | (WO) . |

OTHER PUBLICATIONS

Follow Up To Meeting Jun. 18, 1987.

"British Broadcasting Corporation Specification," pp. 6 and 8, Sep. 1976.

Mitsubishi M50455 TV Screen Character and Pattern Display Controller, prepared for and received by Scientific Atlanta, Inc. before the filing date of the instant application.

Patent Cooperation Treaty International Search Report, 6 pages, Appl'n No. PCT/US 90/02034; Filing Date: Apr. 19, 1990; Date of Competition: Sep. 13, 1990.

"An Interactive Videotex System Foir Two–Way CATV Networks," van den Boom, Henrie, pp. 397–401.

"High Speed Teletex Standard for Cable Television Systems," Martin, Bradley, 6 pages, University of California.

SELECTIVE MESSAGING VIA ON-SCREEN DISPLAY

This application is a continuation of U.S. patent application Ser. No. 08/265,941, filed Jun. 27, 1994, now U.S. Pat. No. 5,754,940, which is a continuation of application Ser. No. 07/960,261, filed Oct. 13, 1992, now U.S. Pat. No. 5,355,480, which is a file wrapper continuation of application Ser. No. 07/342,987, now abandoned, filed Apr. 20, 1989, which is a continuation-in-part of application Ser. No. 07/289,218, filed Dec. 23, 1988, now U.S. Pat. No. 4,987,486 entitled "Automatic Interactive Television Terminal Configuration" and is related to U.S. Pat. No. 5,077,607 entitled "Cable Television Transaction Terminal"; (U.S. Pat. No. 5,001,554,) entitled "Terminal Authorization Method"; U.S. Pat. No. 5,035,883, entitled "Terminal Polling Method"; (U.S. Pat. No. 4,991,011), entitled "Interactive Television Terminal with Programmable Background Audio or Video"; and U.S. Pat. No. 4,994,908, entitled "Interactive Room Status/Time Information System".

TECHNICAL FIELD

This invention relates generally to two-way interactive cable television systems in which entertainment services, information and data signals are provided over cable facilities from a system manager location to a user location, and more particularly to a method and apparatus for controlling the storage of data in local storage at the user location.

BACKGROUND OF THE INVENTION

Two-way interactive cable television systems are known for transmitting entertainment, information and data signals over a cable facility toward a plurality of users. Data may be transmitted and addressed to a particular subscriber over a separate data channel or over a so-called "in-band" data channel. In a downstream direction, addressed control data may represent services authorized to a particular terminal or control commands to that terminal. In an upstream direction from a terminal to the service provider or system manager location, control data may represent selections made by a user in response to a polling request or at the time of user selection.

In a hotel environment, the system manager delivers video signals, e.g., television programming, to user terminals located, for example, in various hotel rooms over cable lines, and the system manager also transmits digital messages to receivers at each room location. Similarly, information and data generated at each room are transmitted upstream to the system manager via the cable.

It is known in the prior art to provide an interactive terminal at a user location including a local processor for controlling access to a host computer located at the system manager location and a local data store connected to the local processor. Such terminals also normally consist of a display for displaying messages to the user or details of the transaction being conducted, and a keyboard or remote key pad comprising a number of keys by which the user can enter data and initiate functions.

Typically, a central data storage is provided at the system manager location for storing a complete data base, and a smaller subset of that data base is maintained in the local store at the user terminal. Because faster response times can be achieved if a requested transaction can be completed without the need for repeatedly accessing the central data base, configuration of the local store becomes an important design consideration. Prior methods of local storage management have been based upon last use or recency of use, and systems are also known in which those items in the data base most frequently requested by the user terminals are retained in the local store. These methods have not, however, been entirely satisfactory, and have not uniformly achieved the desired reduction in response time. Accordingly, there is a need for a more efficient technique for choosing data items to be stored in a local storage of an interactive terminal system.

SUMMARY OF THE INVENTION

It is an object of the present invention to provide an improved method of local storage management for an interactive terminal which ensures faster response times and which reduces the need for repeatedly accessing the central data base.

It is another object of the present invention to provide a method of local storage management for an interactive terminal which updates the local store in accordance with the relative priority of data entries.

It is still another object of the present invention to provide a method of local storage management which updates the local store in accordance with the system service requested by the user.

An interactive terminal, according to the present invention, comprises a processor, a local data store connected to the processor, a character generator responsive to processor control for generating a television signal output to an associated television receiver, a key pad or remote control for inputting information to the processor, and a power supply input.

In a hotel environment, the interactive terminals are located in individual hotel rooms and are coupled, via 2-way RF communications, to a central hotel location, designated as the system manager, where the terminals are accessed by polling for monitoring and servicing the guests' requests. The local storage capacity of the interactive terminal is provided for storing data and a number of character screen commands, accessed from a central data base at the system manager, for use in generating prompting screens displayed on the television receiver. Thus, in use, a hotel guest may call for a variety of services, e.g., pay TV programs, room service and the like, by operating the input keys of the key pad to cause a prompting screen to be displayed on the television receiver.

According to the invention, character screen commands are stored at the terminal according to an assigned priority. The stored screen commands also include pointers which are used by the terminal processor to prefetch other screens which follow the current screen in a decision tree structure manner. These screens are downloaded from the system manager for storage at the terminal so that they are available for display if and when called for. In operation, if a particular branch of a decision tree is not selected by the user, screens associated with that branch are deleted from terminal memory as needed to make room for new screens. The terminal memory is also controlled so that character screen commands are swapped in and out of memory based on their relative priority.

DETAILED DESCRIPTION OF THE PREFERRED EMBODIMENT

Figure 1:
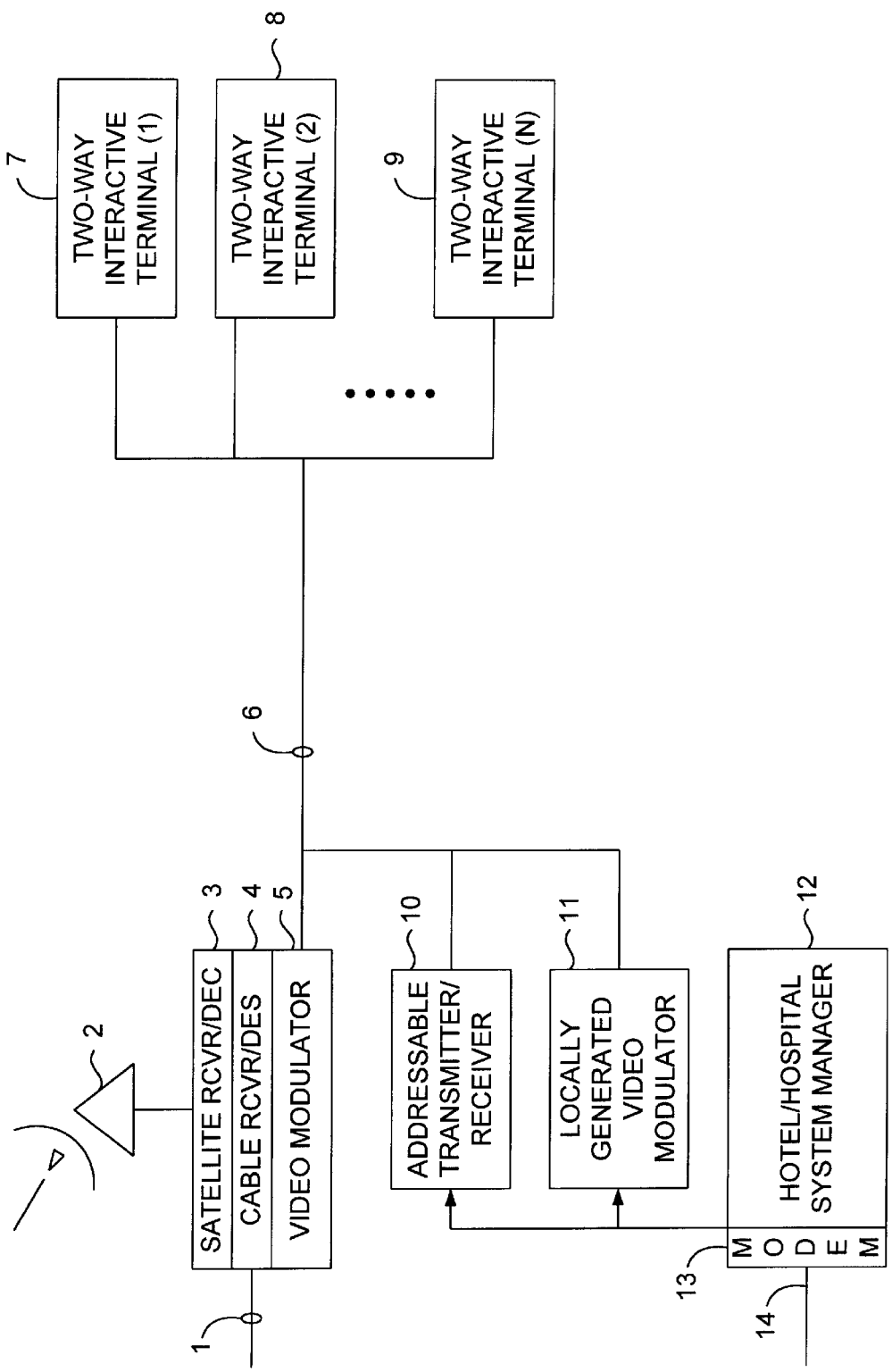
FIG. 1 is a block schematic diagram of an interactive entertainment system in accordance with the present invention applied in a hotel or hospital system environment comprising automatically configurable two-way interactive terminals.

Referring to FIG. 1, there is shown a block schematic diagram of an interactive entertainment system in accordance with the present invention. The depicted embodiment relates to its application in a hotel or hospital system environment, however, the present invention is not so limited, and may be applied in any two-way interactive entertainment system such as a cable or satellite television entertainment system involving a distribution network comprising trunk lines and feeder cables of optical or coaxial cable. For example, satellite receiver and decoder 3, cable receiver and descrambler 4, video modulator 5, addressable transmitter receiver 10, locally generated video modulator 11, and system manager 12 may all be located at the location of a cable television system head end. In this example, coaxial cable or optical fiber link 6 can connect the cable television head end to two-way interactive terminals 7, 8 or 9 of the entertainment system located at individual subscriber premises.

On the other hand, the embodiment of FIG. 1 is especially exemplary of the application of the present invention in a hotel or hospital entertainment system. Transmission link 6, then, may simply comprise a coaxial or optical fiber cable link between an entertainment control center and a plurality of terminals, for example, terminals 7, 8 or 9 located in rooms of the facility.

In particular, at the system control center, a satellite signal may be received at satellite antenna 2 and then received and decoded at satellite receiver decoder 3 for distribution via modulator 5 over a distribution cable 6 to the interactive terminals 7, 8 or 9 of the present invention. Additionally, a band of cable television channels received over cable facilities 1 are received and, if necessary, descrambled at cable receiver/descrambler 4. The descrambled video signals are then modulated at modulator 5 for distribution over facilities 6 to interactive terminals 7, 8 or 9. If desired, an optional scrambler may be provided for scrambling premium channel transmissions to interactive terminals 7, 8, or 9. Of course, terminal 7, 8, or 9, then, would comprise descrambler circuitry capable of descrambling the scrambled premium channel transmissions. Such circuitry is not shown in either FIG. 1 or 2 but would be preferable in a system involving distribution of signals to remote subscriber locations.

According to the exemplary embodiment of FIG. 1, the hotel or hospital location may be connected to other hotels or hospitals via data link 14. Over data link 14, data may be received via modem 13 at system manager 12. In this manner, the hotel or hospital system manager may maintain current status of all features and all interactive terminals of an entertainment system comprising a plurality of hotels. For example, entertainment schedules may be distributed over the data transmission link from a network control center where the entertainment schedule is composed. System manager 12 comprises a data processing unit and appropriate memory for storing status and features associated with all terminals in the system. System manager 12 also controls the generation of video channels at modulator 11, if necessary, for transmission over facility 6 to the two-way interactive terminals 7, 8 or 9. In particular, modulator 11 comprises the capability to generate signals for actuating the display of character screens at terminal locations responsive to the control of the system manager 12 in the event, for example, that terminals are unable to generate the character screens themselves.

The generation of complete screens of characters for transmission to a terminal according to the present invention for display is not required because the terminal (FIG. 2) comprises its own character generator 204. Consequently, locally generated video modulator 11 is optional. Instead, system manager 12 generates commands to generate screens, and not the screens themselves, for transmission via addressable transmitter 10 to an interactive terminal according to the present invention. In a "hybrid" system comprising terminals having no character generator and terminals according to the present invention, locally generated video modulator 11 would be necessary. The screens generated either at the terminal or by way of modulator 11, for example, may relate to the provision of information to guests or patients about hotel or hospital services, respectively.

Also according to FIG. 1, system manager 12 controls an addressable transmitter/receiver 10 for transmitting addressed communications which are uniquely addressed to terminals 7, 8 or 9 and receiving communications at random times or in response to polling requests of terminals. The addressable transmitter 10 according to FIG. 1 may transmit addressed information on a separate data carrier, for example, at 108 megahertz and receive information transmitted in a so-called upstream direction from the terminals on another separate data channel at 25 megahertz. In an alternative embodiment, all downstream communications may be transmitted in band or within a particular television channel transmission, for example, within the horizontal or vertical intervals of transmitted video signals. Consequently, the system manager 12 accomplishes in band signaling by controlling data input into the video signals transmitted via either modulators 5 or 11 (not shown). A separate data carrier for each direction of transmission may be preferred due to the increased data carrying capacity. For upstream transmission, a telephone line or spread spectrum transmission may be employed as an alternative to a separate data channel.

Figure 1A:
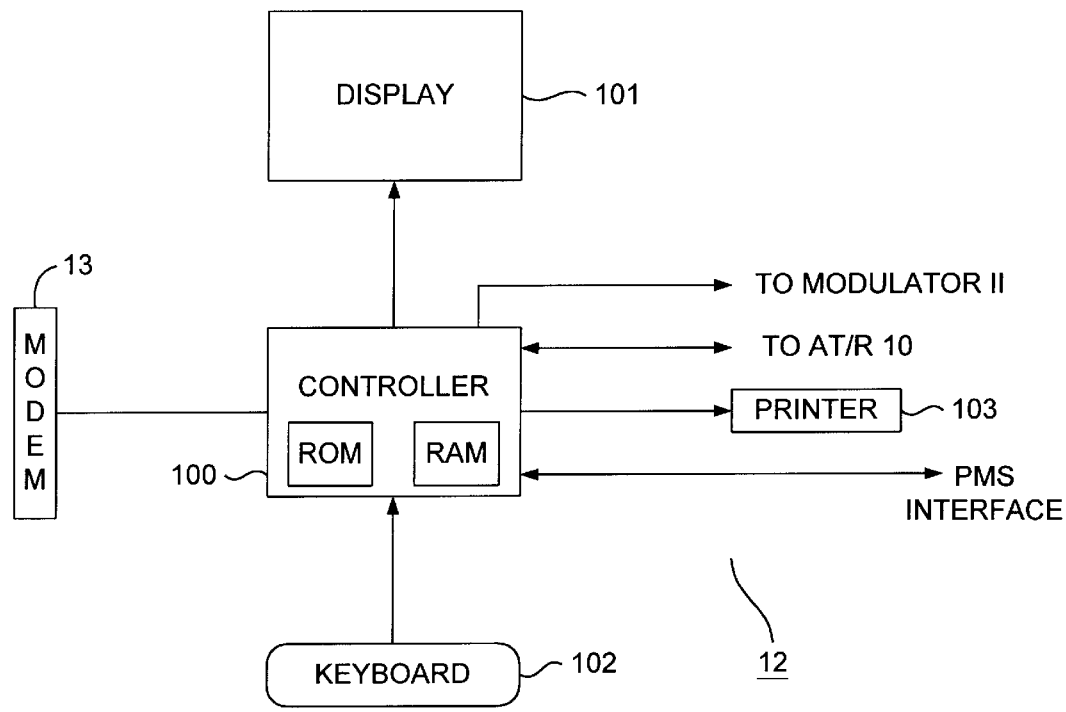
FIG. 1*a* is a block schematic diagram of system manager 12 of FIG. 1.

Referring to FIG. 1*a*, system manager 12 particularly comprises a processor 100, an associated memory, ROM, for storing control algorithms, a read/write memory, RAM, for storing a plurality of character screens, a display screen 101 and a keyboard 102 for screen design and modification. An optional printer 103 is also provided for printing out room checkout bills in a similar manner as would occur at a hotel front desk during checkout.

Besides specifically addressed data communications with the interactive terminals 7, 8 or 9, the system manager may also address communications globally to all interactive terminals which communications may or may not require a terminal to respond. Such global communications, for example, may be addressed to a global address representing all terminals in the particular hotel system or to a group address representing a group of terminals within the system having a commonality of interest.

Figure 2:
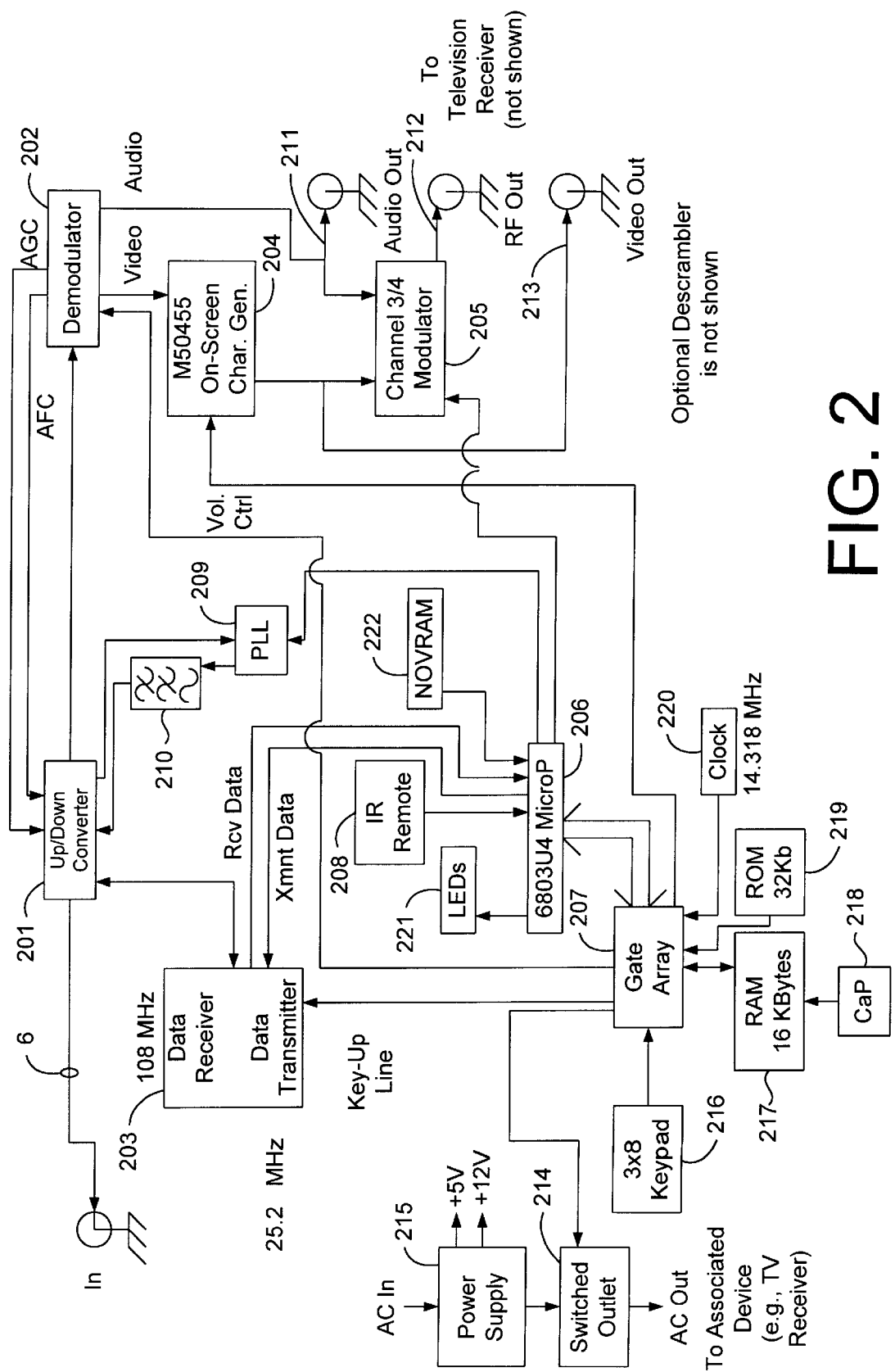
FIG. 2 is a block schematic diagram of a two-way interactive terminal according to the present invention comprising a microprocessor, a memory, a character generator, a key pad and a television signal output to an associated television receiver.

Referring to FIG. 2, there is shown a two-way interactive terminal according to the present invention. The terminal is coupled via facility 6 to video modulator 5, addressable transmitter/receiver 10, and locally generated video modulator 11, if provided, as shown in FIG. 1.

In particular, a two-way interactive terminal according to the present invention comprises an up/down converter 201 for converting channels received over the facility 6 for display at an associated television receiver (not shown) or for transmitting data modulated to 25 megahertz by data transmitter 203 for transmission over facility 6. Up/down converter 201 passes data on the separate data carrier at 108 megahertz for demodulation and reception at data receiver 203. Received television entertainment signals are provided by up/down converter 201 to demodulator 202 which also provides automatic frequency control and gain control of up/down converter 201. Demodulator 202 provides video via on screen character generator 204 to channel ¾ modulator 205. In this manner, on screen character generation may appear superimposed upon an Incoming video signal or displayed in the form of a teletext screen, for example, text on a plain colored background. Also at demodulator 202 the baseband audio channel is transmitted to audio output 211 or via channel modulator 205 to the television receiver at radio frequency. In addition, a baseband video output 213 may be provided from on screen character generator 204 at video output jack 213.

The interactive terminal of the present invention further comprises a processor 206 for controlling data transmission and reception at data receiver/transmitter 203. Processor 206 also controls character generation at character generator 204 via gate array 207. Also via gate array 207, the processor 206 controls a key pad 216 which may be directly coupled to the gate array or coupled via infrared or other remote control transmission link receiver 208. Random access memory (RAM) 217, provided with backup power by capacitor 218, stores character screen commands, downloaded feature data and other data received over the data transmission link via data receiver 203 from the system manager responsive to processor 206 control. The processor 206 also has access to a nonvolatile random access memory 222 and access via gate array 207 to an outboard read only memory (ROM) 219. Processor 206 receives remote control key commands from a remote control key pad via infrared or other remote control transmission receiver 208. Processor 206 may also control the operation of a phase lock loop 209 and bandpass filter 210 for controlling operation of the up/down converter 201.

Power is supplied via an alternating current input to power supply 215 which provides, for example, a plus 5 volt and a plus 12 volt DC input to various components of the terminal requiring such power. Furthermore, the alternating current power input to power supply 215 may be provided via a controlled switched outlet 214 to an associated device such as the television receiver associated with the terminal. The state of the switched outlet 214 is controlled via gate array 207 by processor 206. For example, the switched outlet 214 may continuously provide power to its associated device or provide power only when an "ton" button of key pad 216 or a remote control key pad is set to an on condition.

Values inside of boxes or associated with boxes are exemplary of memory sizes, clock rates, or component types. For example, clock 220 for clocking the microprocessor operation may operate at 14.318 megahertz. The clock signal is divided down by gate array 207 for operation of the microprocessor 206 which may be a Motorola MC 6803U4 or for clocking other processes of the terminal. The on screen character generator 204, for example, may be a Mitsubishi M50455 component. RAM 217 may comprise 16 kilobytes of memory and ROM 219 may comprise 32 kilobytes of memory.

Figure 3:
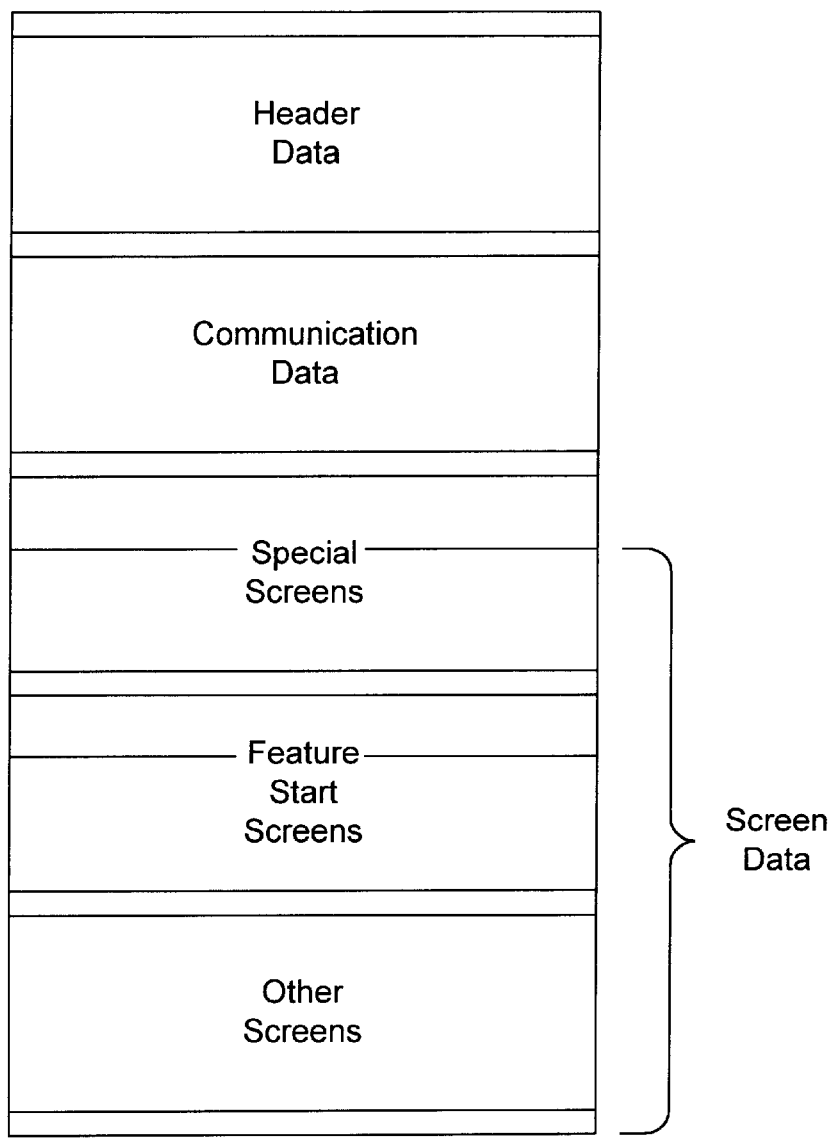
FIG. 3 is a schematic diagram showing the data types stored within the screen data area of RAM 217 of FIG. 2.

Referring now to FIGS. 2–8, the method for controlling storage of screen data in RAM 217 of the interactive terminal will now be described. Referring first to FIGS. 2 and 3, in the preferred embodiment, RAM 217 comprises a screen data area which is divided into a plurality of data blocks. Six data blocks are shown in FIG. 3, however, in the preferred embodiment, RAM 217 is divided into forty seven (47) such blocks. Each data block is comprised of 292 characters, and may contain any one of three types of data, i.e., header data, communications data and screen data. Data in each data block is uniquely identified by a screen number, which is stored at the beginning of the data block, and this screen number also identifies the data "type". In the preferred embodiment, header data have a screen number of 127, screen data have screen numbers in the range of 128–1023, and communications data have screen numbers over 1023.

A Priority List is also stored in RAM 217 and consists of a plurality of pointers to the RAM locations at which the data blocks are stored. These pointers are arranged in order based on the relative priority of data stored within the screen data area, and the Priority List is updated whenever the contents of the screen area are changed. In the preferred embodiment, the Priority List contains forty seven entities which indicate, in priority order, the locations in RAM 217 at which data blocks are stored. Once a data block is stored in RAM 217, its location is never altered, but the data block may be updated with new information or replaced entirely, as will be explained.

Referring again to FIG. 3, each of the data types stored in RAM 217 is assigned a relative priority which is reflected in the organization of the Priority List. Header data is of the highest priority. Next is communications data followed by screen data.

Screen data may be any one of three types—"Special", "Feature Start" and "Other", and is further prioritized according to "type". Screen data is also prioritized within each type according to an assigned priority number in the range from 0 to 7, with 0 being the highest priority and 7 being the lowest priority.

A Special screen is of higher priority than either of the other two screen types, and follows communications data in the priority order. Special screens include, for example, a screen associated with "Power Up", a "Stand By" screen, and various other screens which are critical to the operation of the user terminal.

A Feature Start screen is next in the priority order. The Feature Start screen is the first screen of each feature, e.g., room service, in-room checkout, to be displayed to the user when the feature is selected. A channel map stored in RAM 217 correlates key pad entered channel numbers with either an EIA channel frequency to which the television receiver is to be tuned or with a unique screen number. The channel map thus correlates each of the Feature Start screens with a predetermined user entered channel number so that the Feature Start screen of a particular feature is displayed whenever the user enters the predetermined channel number via key pad 216 (FIG. 2). For example, in FIG. 6, channel 20, entered via key pad 217, is associated with Feature Start screen 490 of the in-room checkout feature. Other channel keyboard entries activate the terminal to tune to an EIA (Electronic Industries Association) channel frequency for receiving a color television signal.

The third screen type is "Other", and "Other" screens rank last in the priority order. These screens are, thus, the first to be analyzed for possible replacement to make room for other screens of higher priority or associated with the feature currently being viewed by the user, as will be explained. Once the "Other" screen area is exhausted, i.e., when no "Other" screen remain in memory which can be removed to make room for incoming screens, the other data types, i.e., Feature Start screens, Special screens, communications data, and header data, are also analyzed in reverse priority order, for possible deletion.

Figures 4, 5:
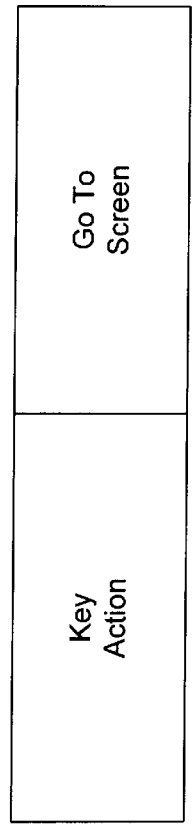
FIG. 4 is a schematic diagram showing the data structure of character screen commands stored in RAM 217 of FIG. 2.
FIG. 5 is a schematic diagram showing the data structure of the key template shown in FIG. 4.

Focusing more specifically on the screen data, the data structure of the character screen commands stored in RAM 217 is shown in FIG. 4. Briefly, as shown in the figure, the screen data consist of a screen number in the range of 128–1023 which is used, as explained above, to uniquely identify the particular screen. Also associated with each screen is a priority number in the range from 0–7, with 0 being the highest priority and 7 being the lowest priority; a cannibal bit, which aids in swapping screen commands in and out of memory, as will be explained; a type field which indicates the screen type, i.e., Special, Feature Start, or Other; a channel number indicating the channel of any background video or audio associated with the screen; an audio field for indicating whether background audio is being used; a feature number field for identifying the feature scenario, i.e., room service, in-room checkout, etc., of which the screen is a part; a time out field for specifying the maximum viewing time of the screen; a key template map for associating a particular key of the key pad with a particular operation to be performed by processor 206; a text field which contains the actual text to be outputted on the television receiver; and an attribute field for defining the screen display characteristics, e.g., the color and intensity of the background, the size of the characters, the character blink rate and the like.

The key template structure is shown in FIG. 5, and specifies for a particular key of the key pad the action to be taken, e.g., prefetch a screen, and/or the screen or channel, i.e., the go-to screen, to be displayed or tuned, respectively at the user terminal when the key is depressed. In the preferred embodiment, key pad 216 is a hand-held battery operated unit and comprises a total of 18 keys which may be programmably defined for each display screen to cause a particular action to be performed and/or to cause a go-to screen to be displayed. The effect of the go-to screen of the key template is to create a decision tree or hierarchical screen structure, in which each character screen command contains one or more pointers from which one or more other screens may be accessed.

Figure 6:
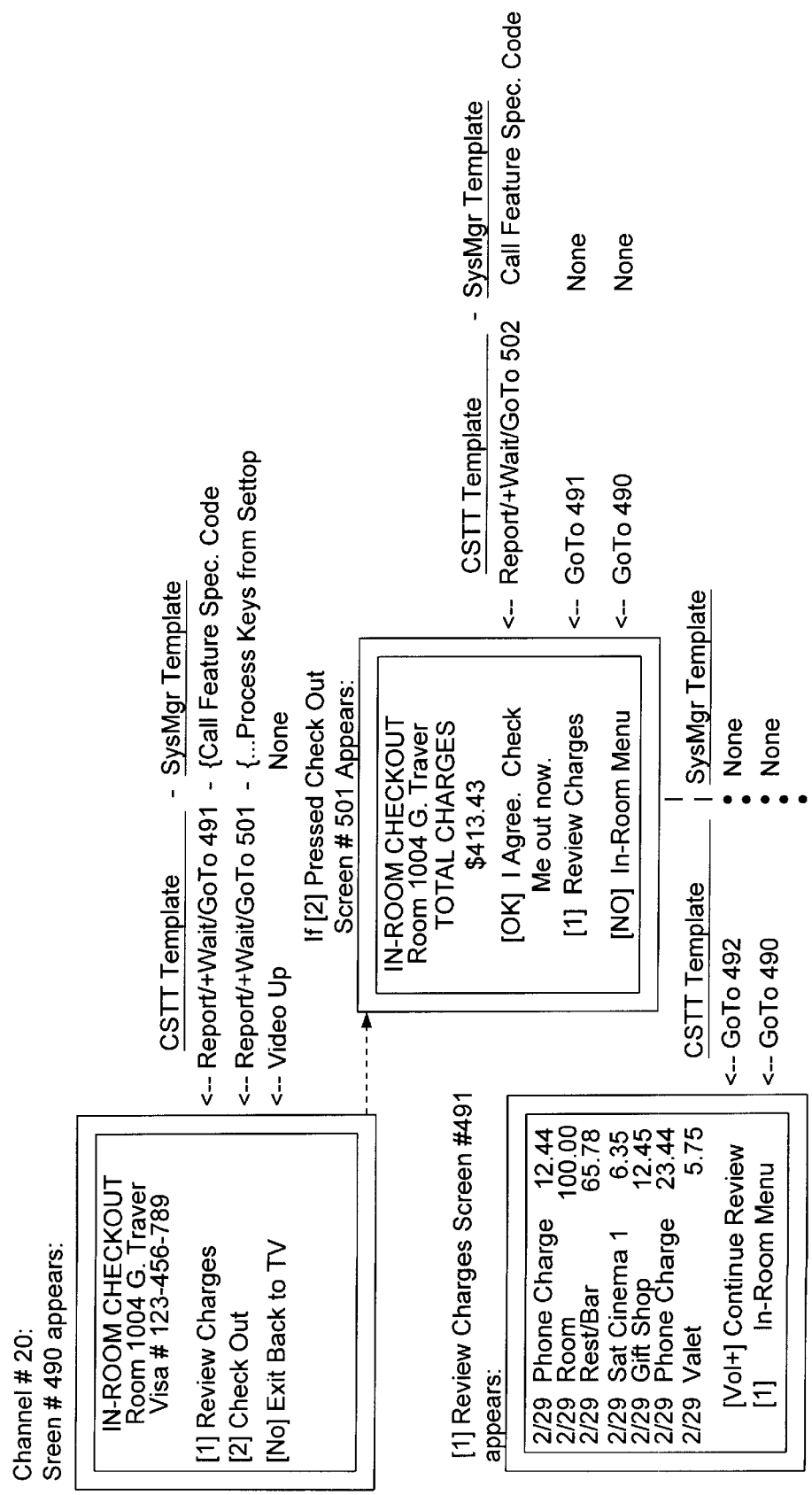
FIG. 6 shows a number of exemplary display screens and associated key templates for the in-room checkout feature.

An example of the key template is shown in FIG. 6 for the in-room checkout feature. As shown in the figure, when the checkout feature is initiated by entering channel 20 on key pad 217, screen 490, which is the Feature Start screen, appears. Screen 490 includes a number of instructions which direct the user to depress the "1" key of key pad 216 to review charges; the "2" key to check out; and the "No" key to exit the feature. A key template is also associated with screen 490, and correlates each of keys 1, 2 and "No", i.e., the expected user responses, with particular actions. Thus, in the example, key 1 causes screen 491 to be displayed; key 2 causes screen 501 to be displayed; and "No" causes the video to be brought up.

In addition to directing action at the user terminal, a key template is also provided, as shown in FIG. 6, to direct certain processing at the system manager location in accordance with the user depressed key. Thus, in the example, depression of key 1 in screen 490 causes the system manager to process the user request and to transfer room charges to the user terminal for display on screen 491. Depression of key 2 causes the system manager to process the total charges for the room, which are displayed on screen 501 and depression of key 3 causes no action at the system manager.

Key templates for the user terminal and system manager are similarly associated with each of the expected key responses of screens 491 and 501, as shown In FIG. 6.

Figure 7A:
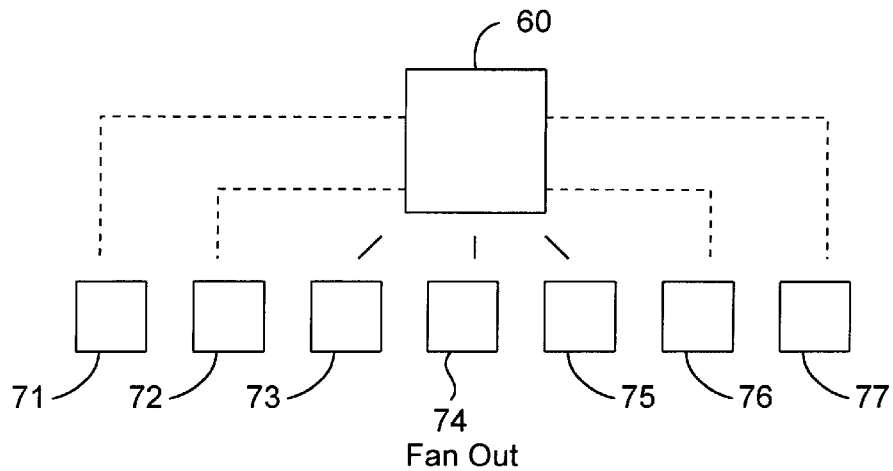
FIG. 7*a* is a block diagram showing the tree structure of a fan-out type feature.
Figure 7B:
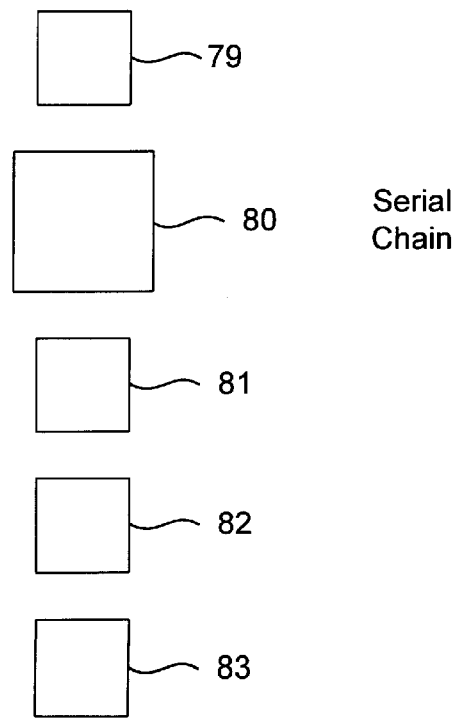
FIG. 7*b* is a block diagram showing the tree structure of a serial chain type feature.

There are two basic types of features and, thus, two different types of decision tree structures shown in FIGS. 7a and 7b. In the "fan-out" type feature (FIG. 7a), the key templates, associated with the screens of the feature, direct the flow of screens so that one of a number of screens located one level below the current screen in the tree structure is displayed responsive to user selection. Once a screen associated with a particular branch of the tree is selected, other screens associated with unselected branches will not be accessed and can, therefore, be considered for deletion, as will be explained. Thus, for example, as shown in FIG. 7a, a user viewing screen 60 may directly access any one of screens 71–77, however, once a particular screen, for example, screen 71, is selected, none of screen 72–77 will thereafter be used. Screens 72–77 can, therefore, be replaced, as needed, by other screens, for example, screens (not shown) following screen 71 in the tree structure, which are likely to be requested by the user.

In contrast to the fan-out feature, in the serial chain type feature (FIG. 7b), the key templates of the associated screens direct the flow of screens so that the user either sequentially progresses from one screen to the next in the chain or skips back and forth along the chain. The in-room checkout feature shown in FIG. 6 is an example of a serial chain type feature.

Besides the key template, a cannibal bit, shown in FIG. 4, is also associated with each screen and is used in controlling the storage of screen data in RAM 217. The cannibal bit has a value of either 0 or 1. The normal state of the cannibal bit is 1, but the cannibal bit is configured as 0 in some screen commands to ensure that the screen is retained in memory. This is particularly useful in dealing with features of the serial chain type. As will be explained, when it is desired to store a screen command in RAM 217 and the screen data area is full, processor 206 will first try to remove screens of type "Other" which belong to a feature other than the feature currently selected. However, if only screens of the current feature exist in memory, processor 206 will scan the list of "go-to" screens for the screen currently being viewed and will delete any screen that is not a direct "go-to." This has the effect of deleting screens associated with unselected branches of the decision tree and is effective in fan-out type features to remove unneeded screens. If the current feature is a serial chain type feature, it is desirable to maintain all or most of the screens of the feature in terminal memory. But because many of these screens are not directly accessible, i.e., will not be "go-to's" of other screens, some screens may be deleted. To avoid this situation, the cannibal bit is configured as "0", which signals processor 206, as will be explained, to retain screens of the same feature in terminal memory without regard to the direct "go-to's."

As will be easily understood, the speed at which the system responds to a user request will largely depend upon whether a particular screen is stored locally or whether there is a need to access the central data base at the system manager location. Storage of all screens locally is impractical because this would require too much local storage. However, access is significantly improved by appropriately configuring the local store so that at any given time, the screens most likely to be requested are available in the terminal memory ready for display.

As explained above, when a user desires to activate a particular feature, e.g., in-room checkout, he first enters a predetermined channel number via the terminal keyboard associated with the feature in the channel map. This then causes the first screen of the selected feature to be displayed on the television receiver. The user may then follow the instructions on the screen to proceed through a sequence of screens associated with the selected feature.

In operation, whenever a user initiates a feature or requests a particular service by depressing a key of the key pad, processor 206 first determines whether the requested screen, i.e., either the Feature Start screen or the "go to" screen associated with the depressed key, is present in RAM 217. If it is, then the screen is accessed for display. If the screen is not present in RAM 217, processor 206 issues a screen request to the system manager which responds by issuing an "Add screen" command to processor 206 for the requested screen.

Aside from requesting a screen from the system manager when the processor determines that a screen requested by a user does not currently reside in memory, processor 206 may also prefetch screens into memory prior to their actual use. This prefetch function is tied to user viewing so that when a user views a screen, screens directly accessible by it, as defined by key template go-to's, and not already stored in memory, will be requested. It is also desirable once a user request has been completely serviced and the user is no longer waiting for a screen, e.g., because he is watching television or because he has left the room, to reconfigure terminal memory to an initialized state. Processor 206 will, thus, check a Special screen list maintained in RAM 217 to determine whether there are Special screens which are not already stored in memory, and if there are, these screens will be requested. The channel map will also be searched to identify the screen numbers of all Feature Start screens, a comparison will be made with those screens existent in terminal memory, and any Feature Start screens not present in memory will also be requested.

The basic mechanism for adding screens to RAM 217 is through the "Add screen" command and its companion "Conditional add screen" command. The "Add screen" command is issued by the system manager to processor 206 responsive to a screen request by the user terminal or when the system manager has a new screen to add to the configuration. The "Conditional add" is issued when the system manager wishes to address a screen globally to all of the interactive terminals in the system, and may also be used to address a screen to a particular terminal.

In operation, when the "Add screen" command is issued, processor 206 determines whether vacant space is available in RAM 217 for storing the incoming screen. If space is available, the new screen is stored in the first empty location, and the Priority List is updated so that the memory address of the new screen is appropriately positioned in the list in accordance with the relative priority of the screen. Otherwise, if the RAM is full, it is necessary to remove screen data from RAM 217, and the algorithm described below is used for this purpose.

In general, the removal method will depend upon the current screen i.e., the screen currently being displayed, and the feature with which it is associated. Thus, all "Other" screens, beginning with the screen having the lowest priority as reflected by the Priority List, are first analyzed for possible deletion by checking whether a particular candidate screen is associated with the current feature. Once a screen is found which is not part of the current feature scenario, that screen is replaced by the new screen. If the user is currently watching television, i.e., is not currently requesting any system service, there is no current feature, so that processor 206 will replace the first "Other" screen in the Priority List, i.e., the "Other" screen with the lowest priority, with the new screen.

If the user is currently viewing a screen and all of the "Other" screens in RAM 217 are associated with the current feature, processor 206 examines the cannibal bit of the incoming screen. If the cannibal bit is 1, processor 206 searches the "Other" screens, again beginning with the screen having the lowest priority, to locate screens not directly accessible from the current screen, i.e., screens that are not direct "go-to's" of the current screen. If a non-go-to screen is located, that screen is replaced by the incoming screen.

If all of the "Other" screens are "go-to" screens of the current screen, or if the cannibal bit is 0, processor 206 will then search the "Feature Start" screens and will choose the screen lowest in priority for removal, except that processor 206 will not remove any screen with a 0 priority and also will not remove the "Feature start" screen of the current feature.

If no "Feature start" screen is found which can be removed, a similar search is made of the Special screens, and the Special screen having the lowest priority will be removed. Again, no screens of 0 priority will be removed.

If no suitable screen can be found for removal, another search is performed depending upon whether the incoming screen was requested by the user terminal. This will generally mean that the screen is essential for continued operation. Thus, if the new screen is the result of a screen request, processor 206 will replace the lowest priority screen in memory, disregarding screens with a 0 priority, with the new screen.

The other mechanism for adding screens to RAM 217 is the "Conditional add screen" command which allows the system manager to address a screen globally to all of the interactive terminals in the system or to a particular terminal. The add command is "conditional" in that each terminal determines whether or not it will accept the new screen and, if the screen is accepted, will make room for the screen in accordance with the algorithm described above.

In determining whether a particular screen will be accepted, processor 206 first determines whether the screen corresponds to, i.e., has a same screen number as, a screen currently residing in memory. If it does, then the old screen is replaced with the new screen data.

If the user is watching television, i.e., is not requesting a system service, at the time the "Conditional add" command is issued, processor 206 will also accept and store all "Feature start" screens and all "Special" screens. This ensures that those screens critical to system operation as well as those screens likely to be needed and requested first are available for immediate display.

If, on the other hand, the user is viewing a screen at the time the "Conditional add" command is issued, the criteria for accepting the incoming screen are different. In particular, if the terminal is currently waiting for this particular screen, the screen will be accepted. Otherwise, "Special" screens and "Feature start" screens with a priority of 0 will be accepted, and "Other" screens will be accepted only if the new screen has the same feature number as the screen currently being viewed and is either a direct "go-to" of the current screen or has a cannibal bit of 0.

This invention has been described in detail in connection with the preferred embodiment. However, it will be easily understood by those skilled in the art that other variations and modifications can be made within the scope of the invention as defined by the appended claims.

We claim:

1. An apparatus for processing signals received from a communications network, comprising:
    a first path for processing a received video signal;
    a second path for processing a received message signal, including means for retrieving control data appended to the message signal;
    means responsive to the control data for generating a control signal; and
    means responsive to the control signal for selectively outputting a processed video signal from said first path, a processed message signal from said second path, or a combined output comprising both the processed video and processed message signals.

2. An apparatus in accordance with claim 1 further comprising:
    means for determining if a video signal is present in said first path; and
    means responsive to said determining means for controlling said selective output means to output only the processed message signal when there is no video signal present in the first path.

3. An apparatus in accordance with claim 2 wherein said determining means comprises a video sync detector.

4. An apparatus in accordance with claim 1 further comprising video display generator means in said second path for converting data contained in the received message signal to a video message signal for input to said selective output means.

5. An apparatus in accordance with claim 4 further comprising:
    means for detecting a video sync signal in said first path; and
    means for inputting the video sync signal to said video display generator for use in synchronizing the video message signal to the processed video signal.

6. An apparatus for processing signals received from a communications network, comprising:
    a first path for processing a received video signal;
    a second path for processing a received message signal;
    memory means coupled to said second path for storing message data obtained from the message signal;
    means coupled to said second path for retrieving control data appended to the message signal; and
    means responsive to the retrieved control data for outputting the message data combined with a processed video signal from said first path, outputting the message data alone, or storing the message data in said memory means.

7. Apparatus for selectively distributing messages over a communications network comprising:
    an addressable controller for communicating with a plurality of subscriber terminals served by a communications network;
    means operatively associated with said addressable controller for assigning each of said subscriber terminals to a primary message group;
    means operatively associated with said addressable controller for assigning selected ones of said subscriber terminals to one or more message subgroups;
    means for inputting text messages to said addressable controller for subsequent transmission to a subscriber terminal for display;
    means operatively associated with said addressable controller for tagging the messages with distribution data defining at least one primary message group or message subgroup to receive the message; and
    means for transmitting the tagged text messages over the network together with signals from network service providers.

8. Apparatus in accordance with claim 7 wherein the messages are transmitted together with control data in an addressable data stream carried on said network.

9. An apparatus for processing signals received from a communications network, comprising:
    a first path for processing a received video signal;
    a second path for processing a received message signal;
    means responsive to a control signal for selectively outputting a processed video signal from said first path, a processed message signal from said second path, or a combined output comprising both the processed video and processed message signals;
    means for determining if a video signal is present in said first path; and
    means responsive to said determining means for controlling said selective output means to output only the processed message signal when there is no video signal present in the first path.

10. A terminal system comprising:
    a first receiver for receiving a video signal;
    a second addressable receiver for receiving a plurality of message signals addressed to said terminal system, each message signal having video data and an identifying code;
    a memory, coupled to the addressable receiver, for storing the message signals;
    a processor for generating a control signal corresponding to the identifying code of one of the message signals in said memory;
    a character display generator, responsive to the control signal and coupled to said memory and said first receiver, for displaying the video data of the one message signal overlaid on one of the video signal and a plain video background.

11. The terminal system of claim 10 wherein said processor generates the control signal in accordance with an input signal from a keypad.

12. The terminal system of claim 10 wherein each message signal includes an assigned priority, the assigned priority of the one message signal being higher than the assigned priority of other message signals which have an equivalent identifying code.

13. The terminal system of claim 10 wherein the video data of the one message signal includes a text screen.

14. The terminal system of claim 13 wherein the text screen includes billing information.

15. The terminal system of claim 10 wherein the message signal includes attribute data for defining display characteristics, said character generator displaying the video data of the one message signal in accordance with the attribute data.

16. The terminal system of claim 10 further comprising:

user input circuitry, coupled to said processor, for receiving a user input which identifies a desired message signal for display, wherein said processor generates the control signal in accordance with the user input.

* * * * *

UNITED STATES PATENT AND TRADEMARK OFFICE
CERTIFICATE OF CORRECTION

PATENT NO. : 6,195,530 B1
DATED : February 27, 2001
INVENTOR(S) : Smith et al.

It is certified that error appears in the above-identified patent and that said Letters Patent is hereby corrected as shown below:

<u>Column 5,</u>
Line 66, delete ""ton"", and insert therefore -- "on" --

Signed and Sealed this

Fourteenth Day of August, 2001

Attest:

*Attesting Officer*

NICHOLAS P. GODICI
*Acting Director of the United States Patent and Trademark Office*